United States Patent
Camilleri

(10) Patent No.: US 11,738,391 B2
(45) Date of Patent: Aug. 29, 2023

(54) 3D PRINTER WITH COMPUTERIZED CONTROLLER FOR PROGRESSIVE ALLOY COMPOSITION CHARACTERISTIC MODIFICATION

(71) Applicant: EFFUSIONTECH PTY LTD, Bayview (AU)

(72) Inventor: Steven Camilleri, Bayview (AU)

(73) Assignee: EFFUSIONTECH IP PTY. LTD., Dandenong (AU)

( * ) Notice: Subject to any disclaimer, the term of this patent is extended or adjusted under 35 U.S.C. 154(b) by 486 days.

(21) Appl. No.: 16/638,640

(22) PCT Filed: Aug. 14, 2018

(86) PCT No.: PCT/AU2018/050856
§ 371 (c)(1),
(2) Date: Feb. 12, 2020

(87) PCT Pub. No.: WO2019/033156
PCT Pub. Date: Feb. 21, 2019

(65) Prior Publication Data
US 2021/0031263 A1    Feb. 4, 2021

(30) Foreign Application Priority Data

Aug. 15, 2017  (AU) .......................... AU2017903262

(51) Int. Cl.
*B22F 3/10* (2006.01)
*B33Y 30/00* (2015.01)
(Continued)

(52) U.S. Cl.
CPC ............ *B22F 3/1035* (2013.01); *B22F 12/58* (2021.01); *B28B 1/001* (2013.01); *B33Y 30/00* (2014.12);
(Continued)

(58) Field of Classification Search
CPC ........ B22F 3/1035; B22F 12/58; B22F 12/53; B22F 12/55; B22F 10/10; B22F 10/20;
(Continued)

(56) References Cited

U.S. PATENT DOCUMENTS 6,401,001 B1 *  6/2002  Jang ....................... B33Y 50/02
                                                  204/192.15
6,592,947 B1 *  7/2003  McCane ................... C23C 2/06
                                                  427/427

(Continued)

FOREIGN PATENT DOCUMENTS

CA          2843188 A1 *  2/2013  .............. B22F 10/00
CN       106825574 A  *  6/2017
(Continued)

OTHER PUBLICATIONS

CN 106825574 A (Year: 2023).*
JP-2017052129-A translation (Year: 2023).*

*Primary Examiner* — Francisco W Tschen
*Assistant Examiner* — Guy F Mongelli
(74) *Attorney, Agent, or Firm* — Welsh Flaxman & Gitler LLC

(57) ABSTRACT

The invention relates to a 3D printer. The 3D printer includes a first feeder containing a metallic powder first print material, a second feeder containing a metallic powder second print material, delivery means that sprays the print materials, a holder holding a substrate, and a controller. As the print materials are sprayed from the delivery means the controller, which is computerized, adjusts the relative disposition of the delivery means and substrate, and the controller controls the first and second feeders to each feed their print material to the delivery means, so that the print materials form a 3D article on the substrate wherein different parts of the 3D article have different characteristics due to the different print (Continued)

materials or proportions thereof being used for different portions of the 3D article.

15 Claims, 2 Drawing Sheets

(51) Int. Cl.
*B28B 1/00* (2006.01)
*G06T 17/00* (2006.01)
*B22F 12/58* (2021.01)
*B22F 12/55* (2021.01)
*B22F 12/53* (2021.01)
*B22F 10/25* (2021.01)
*B22F 12/52* (2021.01)

(52) U.S. Cl.
CPC .............. *G06T 17/00* (2013.01); *B22F 10/25* (2021.01); *B22F 12/52* (2021.01); *B22F 12/53* (2021.01); *B22F 12/55* (2021.01)

(58) Field of Classification Search
CPC ...... B22F 10/30; B22F 2998/10; B22F 10/00; B28B 1/001; G06T 17/00; B33Y 30/00; B33Y 50/02; B33Y 70/00; C23C 24/04; C23C 30/00; Y02P 10/25; B29C 64/165; B29C 64/209; B29C 64/153; B29C 64/343; B29C 64/393

See application file for complete search history.

(56) References Cited

U.S. PATENT DOCUMENTS

| | | | |
|---|---|---|---|
| 7,993,123 B2* | 8/2011 | Wigand | B29C 64/112 425/176 |
| 2002/0016386 A1* | 2/2002 | Napadensky | B33Y 70/00 349/1 |
| 2003/0175559 A1* | 9/2003 | Morelli | C23C 24/04 427/427 |
| 2012/0272523 A1 | 11/2012 | Calla et al. | |
| 2015/0273577 A1* | 10/2015 | Vader | B22F 12/53 164/513 |
| 2016/0279703 A1* | 9/2016 | Clare | C23C 4/10 |
| 2017/0014950 A1* | 1/2017 | Okada | B22F 10/47 |
| 2018/0143617 A1* | 5/2018 | Shen | B33Y 50/02 |

FOREIGN PATENT DOCUMENTS

| | | | | |
|---|---|---|---|---|
| EP | 3112134 A1 | 1/2017 | | |
| JP | 2017052129 A | * | 3/2017 | .............. B22F 10/00 |
| WO | 2013149291 A1 | 10/2013 | | |

* cited by examiner

3D PRINTER WITH COMPUTERIZED CONTROLLER FOR PROGRESSIVE ALLOY COMPOSITION CHARACTERISTIC MODIFICATION

FIELD OF INVENTION

This invention relates to a 3D printer.

BACKGROUND

There are various ways for making articles from metallic materials. Production by casting is a common technique when working with pure metals and alloy. This involves melting metallic material and then applying it to a mold. The molten material solidifies to form an appropriately shaped article. Because the molten material is homogeneous, usually the only way to regulate the strength of the various portions of the article is by way of the shape and configuration of the mold. In other words the mold is shaped to cause some walls of the finished article to be thicker than others.

It is also known to form articles from metallic powders. More specifically, they are produced from a combination of homogeneously mixed powders that are sprayed onto a substrate. However the spray is uniform throughout the article and so, again, regulating the strength of different portions is achieved by regulating the thickness of the article's walls.

It is also known to adjust the properties of a powder sprayed article by way of post-forming heat treatment. However this tends to affect the entire volume of the article, or just its outer skin.

It is an object of a preferred embodiment of the invention to go at least some way towards producing an article where different parts have different characteristics, without having to adjust wall thickness. While this applies to the preferred embodiment, it should not be seen as a limitation on the scope of any claims expressed more broadly. In this regard the object of the invention per se is simply to provide the public with a useful choice.

The term "comprising" if and when used in this document in relation to a combination of features should not be taken to rule out the option of there being other features. Such features may or may not be present.

SUMMARY OF INVENTION

According to one aspect of the invention there is provided a 3D printer comprising:
  a first feeder containing a metallic powder first print material;
  a second feeder containing a metallic powder second print material;
  delivery means (eg a nozzle) that sprays the print materials;
  a holder holding a substrate; and
  a computerised controller that adjusts, as the print materials are sprayed from the delivery means:
    the relative disposition (eg in terms of spacing and/or angle) of the delivery means and substrate; and
    the first and second feeders to each feed their print material, to the delivery means;
  so that the print materials form a 3D article on the substrate wherein different parts of the article have different characteristics (eg strength, grain, electrical conductivity, heat conductivity, corrosion resistant, stiffness, wear resistant, crack deflective or energy absorbing characteristics) due to the different print materials or proportions thereof being used for different portions of the 3D article.

Optionally the 3D printer is such that:
  the print materials are each conveyed in a gas (eg air) stream;
  the controller adjustably controls the amount of each print material in the gas stream;
  the delivery means comprises a nozzle; and
  the controller references a CAM file to determine relative positions of the holder and/or nozzle, and the amount of each print material sprayed, as the 3D article is built from the print materials.

A 3D printer according to claim 1 or 2, wherein the controller notionally divides the article into 3D coordinates prior to formation, and controls the amount of the print materials directed to each corresponding real coordinate of the article as it builds.

Optionally the controller regulates the amount of print material fed from each feeder so that different parts of the article have different strength, grain, electrical conductivity, heat conductivity, corrosion resistant, stiffness, wear resistant, crack deflective or energy absorbing characteristics.

Optionally the first and second print materials are different.

Optionally the delivery means has a common outlet (eg a nozzle) for the print materials.

Optionally the controller causes the first and second print materials to merge in regulated proportions before being emitted from the delivery means.

Optionally the delivery means has an outlet (eg a first nozzle) for the first print material another outlet (eg a second nozzle) for the second print material.

Optionally the delivery means delivers the first print material from the first feeder at a different temperature and/or velocity to the second print material from the second feeder.

Optionally the speed and/or temperature of print material from either feeder is regulated by the controller.

Optionally one or more additional feeders for one or more respective additional print materials, such feeders performing in substantially the same way as the first and second feeders to provide for a wider range print materials or mixtures thereof.

Optionally one or more of the print materials comprise metallic powder combined with a non-metallic material (eg a ceramic and/or polymer) in powder or other form.

According to a further aspect of the invention there is provided a method for making three dimensional metal objects consisting of two or more complex interlocking regions composed of discrete alloy compositions, with the option of intermediate or transitional regions between the two or more primary regions where the alloy composition varies progressively from one composition to another, the method comprising of:
  a) two or more hoppers capable of containing metallic powders;
  b) a system of powder feeders and tubes capable of conveying the powders in an airstream at a known mass flow rate;
  c) a method of digitally controlling the mass flow rate of the powders;
  d) a cold spray nozzle (eg of a type known to the art) that receives the powders;
  e) a target or substrate that receives the cold spray deposit;

f) a motion system embodying a method of manipulating the nozzle and/or target in space to trace out a complex tool path in 3d space;
g) a method of digitally controlling the motion system;
h) a method of controlling the composition and location of metal powder deposited on the substrate, consisting of:
   i. a set of algorithms, capable of converting a CAM file into a sequence of non-trivial tool paths that will cause the part to be created out of sprayed metal powder deposited by the cold spray nozzle on the target;
   ii. a subsidiary set of algorithms capable of interpreting the tool path and relating it continuously to the region of the CAM file object it will create;
   iii. a subsidiary set of algorithms that interrogates the CAM file to determine the required alloy composition for each element of the tool path; and
   iv. a set of algorithms that convert the alloy composition requirement into a set of flow rate demand for powder feeds from the constituent hoppers.

DRAWINGS

Some preferred embodiments of the invention will now be described by way of example and with reference to the accompanying drawings of which:

DETAILED DESCRIPTION

Figure 1:
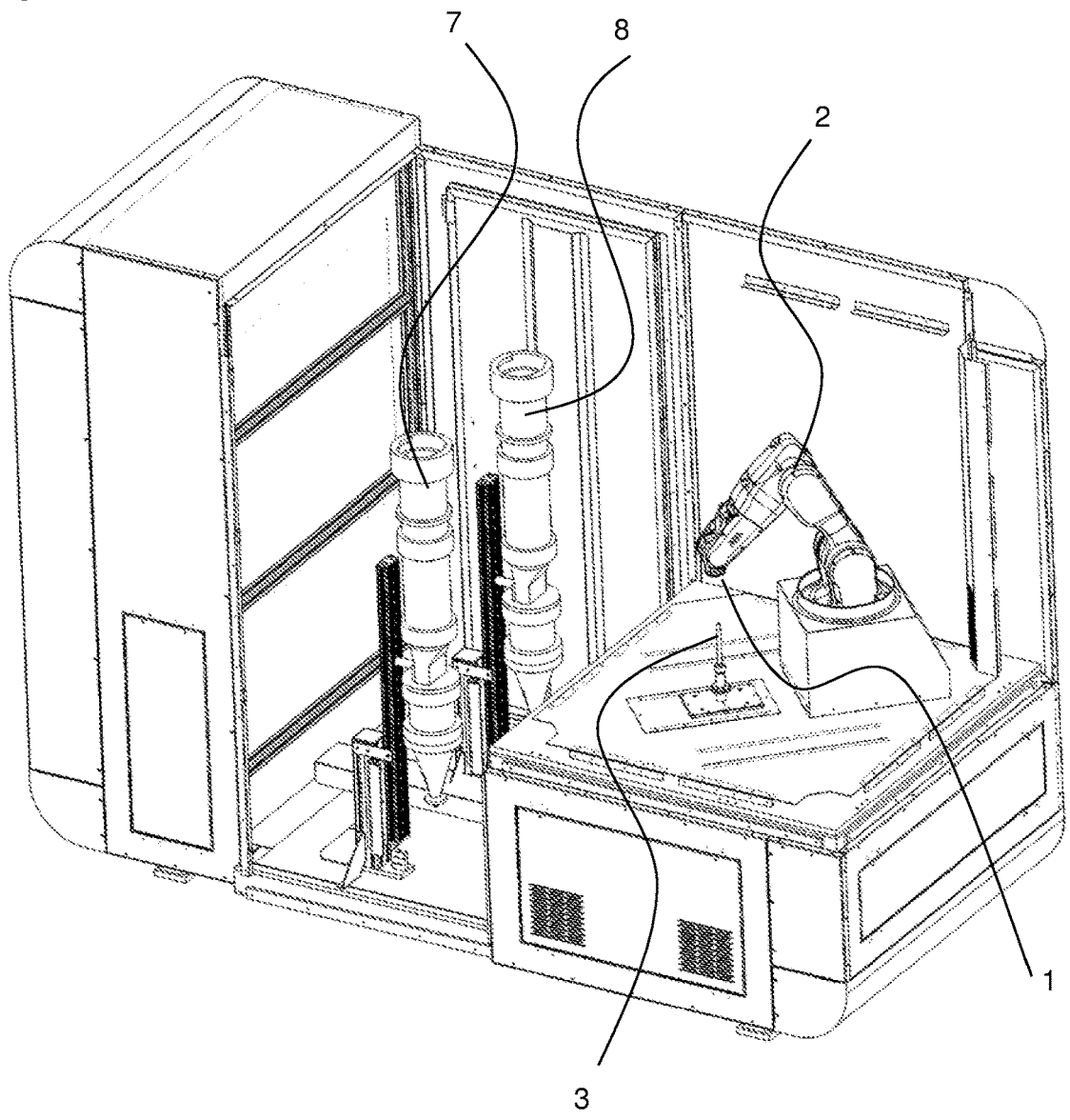
FIG. 1 is an isometric view of a 3D printer.
Figure 2:
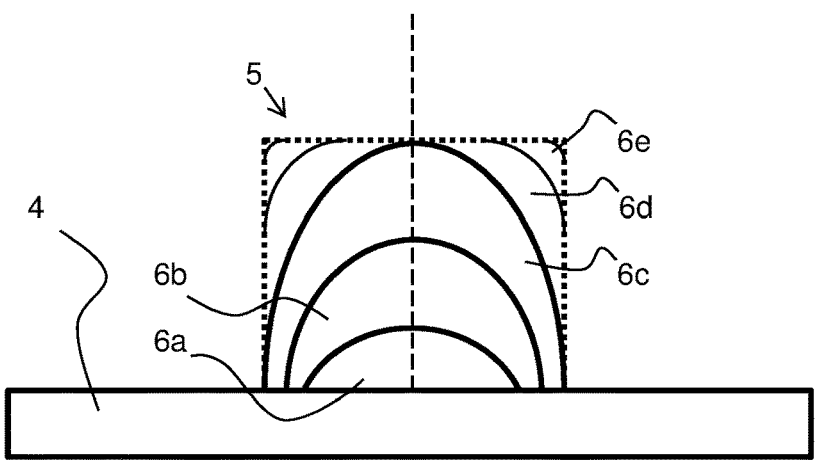
FIG. 2 is a schematic side view of an item which has been 3D printed onto a substrate.

Referring to FIG. 1, a 3D printer comprises a grip 1 that incorporates a moveable robotic arm 2. The printer also has a cold spray head 3. The grip 1 holds a substrate and exposes it to print material (in the form of a metallic powder) sprayed from the spray head 3 to build up a 3D item on the substrate. The substrate 4 is shown in FIG. 2 with a 3D item 5 when built from incremental layers 6 a-e of print material. The robotic arm 2 adjusts position and orientation as the item builds so that the print material is applied at the correct angle and spacing.

Movement of the grip 1 (via the robotic arm), the substrate 4 and the spray head 3 is controlled by a computerised controller. The controller is programmed with geometry parameters (eg 3D coordinates) for the item to be created, and causes print material to issue from the spray head to contact the substrate or the partially formed item at the correct angle, speed and temperature for an optimum result.

Referring to FIG. 1, in order to regulate the strength of different parts of the article the controller causes the spray head 3 to spray powdered metallic print material having different characteristics for different portions of the article. More particularly, different amounts or concentrations of spray material are directed by the controller to different 3D coordinates. As a result different portions of the finished article have different characteristics. This may be achieved by changing from one metallic powder to another, or by adjusting the mix of powders. To facilitate this there is a first powder feeder 7 and a second power feeder 8. Metallic powder from each feeder is fed to a spray delivery means which incorporates the spray head 3. The spray head may be in the form of a nozzle.

Figure 3:
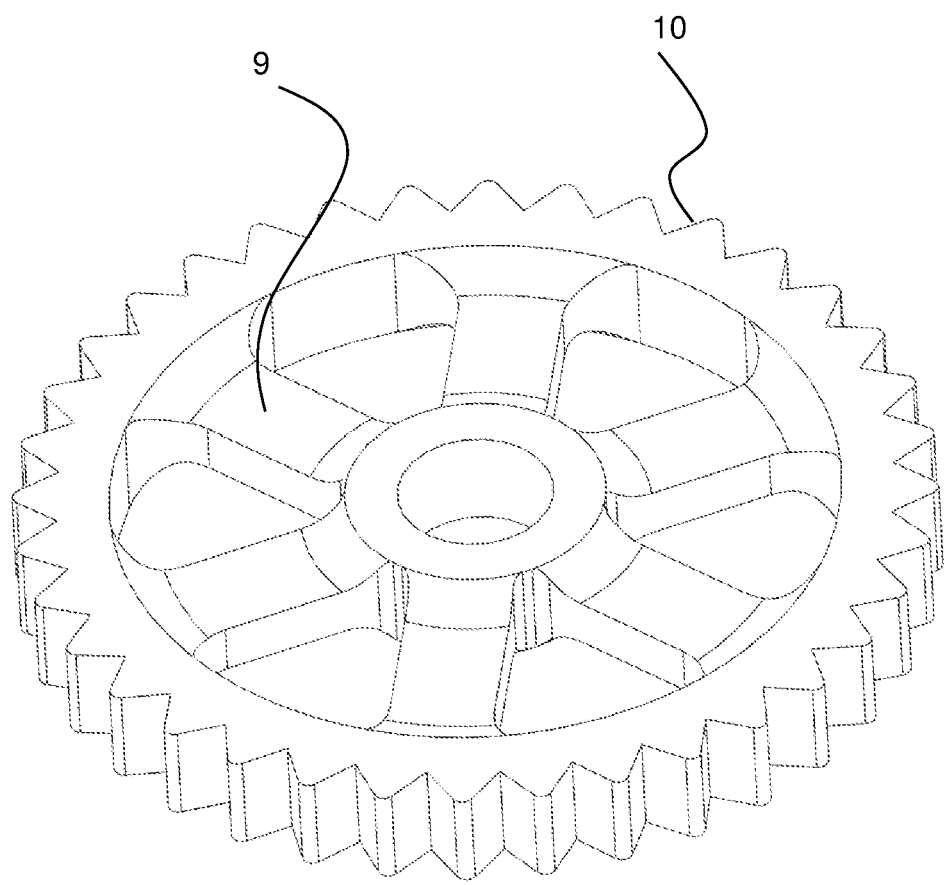
FIG. 3 is a schematic illustration of a gear wheel formed by the printer.

The powder from one feeder is stronger and heavier when hardened/set compared to the powder of the other feeder. Therefore for parts of the article that are not required to be so robust the lighter powder may be used, and for parts that are required to be more so the heavier powder may be used. To obtain strength characteristics between the two extremes the controller determines proportions for a mix of the powders. By way of example, FIG. 3 illustrate a gear wheel printed by the printer. The spokes 9 and perimeter gears 10 are formed from different spray materials, or different blends of the spray materials, to give them the desired characteristics.

In a similar manner the print materials may be selected to give different portions of the article different thermal or electrical conductivity; for example by using more or less of an electrical or heat conducting spray material such as aluminum or copper containing powders, etc. By way of further example, portions of the article more prone to corrosive influences may be formed from powders having a greater proportion of corrosion resistant materials or sealants. Similarly for portions of the article requiring particular stiffness, wear resistant, crack deflective or energy absorbing characteristics.

In some embodiments of the invention one of the feeders 7,8 may have metallic powder per se, such as aluminum, and various other feeders may have additive powders that will combine with the aluminum to give alloys such as Alloy 6061 or Alloy 7075 when added in the right proportion. In the case of Alloy 6061, the additive powder may comprise chromium, copper, iron, magnesium, manganese, silicon, titanium and zinc. The additive powders can be subjected to various heat treating and sintering processes such as liquid phase sintering, to give the desired end properties. These processes may be applied prior to, or subsequently to, printing and may take advantage of local variations in composition, for instance a low-melting temperature phase encapsulated in a high melting temperature phase.

In a particularly preferred embodiment the print material in the first feeder 7 is Valimet 6061 Aluminum applied as a cold spray at a temperature of 500° C. and a velocity of 700 m/s. A particularly preferred material for the print material in the second feeder 8 is MSSA CP Copper applied as a cold spray at a temperature of 500° C. and a velocity of 700 m/s.

To give further examples, the powder in the first feeder 7 may be MSSA CP Aluminium and the powder in the second feeder may be MSSA CP Zinc.

In preferred embodiments of the invention the controller controls the emission of the sprayed powders, or the mix of these, to give the printed article the desired grain orientation.

While some preferred forms of the invention have been described by way of example it should be understood that modifications and improvements can occur without departing from the following claims.

The invention claimed is:

1. A 3D printer comprising:
   a first feeder containing a metallic powder first print material;
   a second feeder containing a metallic powder second print material;
   delivery means that sprays print materials, the first print material from the first feeder and the second print material from the second feeder is fed to the delivery means;
   a holder holding a substrate; and
   a computerized controller to control composition and location of the first print material and the second print material deposited on the substrate, the controller generating a sequence of tool paths causing creation of a 3D article, interpreting a tool path and continuously relating the tool path to a region of the 3D article, determining a required alloy composition for each element of the tool path, and converting the alloy composition requirement into a set of flow rate demand for feeds of the first print material and the second print material such that an applied alloy composition varies progressively as the delivery means moves along the tool path;

wherein as the first print material from the first feeder and the second print material from the second feeder are sprayed from the delivery means, the controller continuously adjusts the relative disposition of the delivery means and the substrate, and the controller continuously controls the first and second feeders to each feed their print material to the delivery means, so that the print materials form a 3D article on the substrate wherein different parts of the 3D article have different alloy composition characteristics due to the first and second print materials or a mixture thereof being progressively and continuously used for different portions of the 3D article.

2. The 3D printer according to claim 1, wherein:
the first and second print materials are each conveyed in a gas stream;
the controller adjustably controls the amount of each of the first and second print materials in the gas stream;
the delivery means comprises a nozzle; and
the controller references a CAM file to determine relative positions of the holder and/or the nozzle, and an amount of each of the first and second print materials sprayed, as the 3D article is built from the first and second print materials.

3. The 3D printer according to claim 2, wherein the controller notionally divides the article into 3D coordinates prior to formation and controls the amount of the first and second print materials directed to each corresponding real coordinate of the 3D article as it builds.

4. The 3D printer according to claim 1, wherein the controller notionally divides the article into 3D coordinates prior to formation and controls an amount of the first and second print materials directed to each corresponding real coordinate of the 3D article as it builds.

5. The 3D printer according to claim 1, wherein the controller regulates the amount of print material fed from each of the first and second feeders so that different parts of the 3D article have different strength, grain, electrical conductivity, heat conductivity, corrosion resistant, stiffness, wear resistant, crack deflective, or energy absorbing characteristics.

6. The 3D printer according to claim 1, wherein the first and second print materials are of different material characteristics.

7. The 3D printer according to claim 1, wherein the delivery means has a common outlet for the first and second print materials.

8. The 3D printer according to claim 1, wherein the controller causes the first and second print materials to merge in regulated proportions before being emitted from the delivery means.

9. The 3D printer according to claim 1, wherein the delivery means has a first outlet nozzle for the first print material and a second outlet nozzle for the second print material.

10. The 3D printer according to claim 1, wherein the delivery means delivers the first print material from the first feeder at a different temperature and/or velocity than the second print material from the second feeder.

11. The 3D printer according to claim 1, wherein a speed and/or temperature of the first or second print material from either the first or second feeder is regulated by the controller.

12. The 3D printer according to claim 1, including one or more additional feeders for one or more respective additional print materials, the one or more additional feeders performing in substantially the same way as the first and second feeders to provide for a wider range of print materials or mixtures thereof.

13. The 3D printer according to claim 1, wherein one or more of the print materials comprise metallic powder combined with a non-metallic material.

14. The 3D printer according to claim 13, wherein the non-metallic material is a ceramic and/or polymer.

15. The 3D printer according to claim 1, further including a robotic arm which adjusts position and/or orientation as the item builds so that the first and/or second print materials are applied at a correct angle and spacing.

* * * * *